United States Patent
Lucas et al.

(10) Patent No.: US 9,534,629 B1
(45) Date of Patent: Jan. 3, 2017

(54) COMPOUND AIR AND MECHANICAL BEARING SYSTEM AND METHOD

(71) Applicant: BorgWarner Inc., Auburn Hills, MI (US)

(72) Inventors: Evan Lucas, Asheville, NC (US);
Christian Longacre, Arden, NC (US);
Zachary Ashton, Arden, NC (US);
Sean Hastings, Arden, NC (US);
Srikar Yellapragada, Fletcher, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/960,758

(22) Filed: Dec. 7, 2015

(51) Int. Cl.
*F16C 21/00* (2006.01)
*F16C 17/02* (2006.01)
*F16C 32/06* (2006.01)

(52) U.S. Cl.
CPC ............. *F16C 21/00* (2013.01); *F16C 17/024* (2013.01); *F16C 32/0614* (2013.01)

(58) Field of Classification Search
CPC ....... F16C 21/00; F16C 41/001; F16C 17/024; F16C 32/0614
See application file for complete search history.

(56) References Cited

U.S. PATENT DOCUMENTS

| | | | |
|---|---|---|---|
| 2,986,430 A | 5/1961 | Banerian | |
| 3,012,827 A | 12/1961 | Goetz | |
| 3,026,154 A | 3/1962 | Marchand | |
| 3,058,786 A | 10/1962 | Banerian | |
| 3,272,999 A | 9/1966 | Turk | |
| 3,360,310 A | 12/1967 | Hiatt et al. | |
| 3,642,331 A | 2/1972 | Silver | |
| 3,708,215 A | 1/1973 | Wilcock et al. | |
| 3,759,588 A | 9/1973 | Anderson | |
| 3,951,474 A * | 4/1976 | Hughes | F01D 5/10 384/103 |
| 4,223,958 A * | 9/1980 | Gray | F16C 17/024 384/99 |
| 4,394,091 A | 7/1983 | Klomp | |
| 5,348,401 A * | 9/1994 | Justak | F16C 32/0662 384/101 |
| 6,568,854 B2 * | 5/2003 | Schleinitz | E02F 9/12 384/448 |
| 7,300,209 B2 | 11/2007 | Kim et al. | |
| 8,016,554 B2 | 9/2011 | Ward | |
| 8,308,364 B2 | 11/2012 | Tecza et al. | |
| 8,784,035 B2 | 7/2014 | Blackstone | |
| 2013/0227931 A1 | 9/2013 | Danguy et al. | |

* cited by examiner

*Primary Examiner* — Thomas R. Hannon
(74) *Attorney, Agent, or Firm* — BrooksGroup (57) ABSTRACT

A bearing system and method may include a first bearing assembly that may have an inner race. An outer race may be disposed around the inner race and may be rotatable relative to the inner race. A second bearing assembly may be disposed around the first bearing assembly. The second bearing assembly may be an air bearing. The outer race may be engageable with the inner race through the engagement mechanism that acts on the outer race so that the inner and outer races rotate together.

20 Claims, 4 Drawing Sheets

COMPOUND AIR AND MECHANICAL BEARING SYSTEM AND METHOD

TECHNICAL FIELD

The field to which the disclosure generally relates includes bearing systems for rotating elements and in particular, includes bearing systems in turbochargers.

BACKGROUND

Bearings typically support rotating elements in a low friction manner, and may be employed in a variety of environments. For example, a turbocharger, such as that used to charge the intake air of an internal combustion engine, may include a compressor driven by a turbine. The turbine may be connected to the compressor by a common shaft that may be supported for rotation by bearings. The shaft and its connected turbine and compressor wheels may rotate at speeds that approach hundreds of thousands of revolutions per minute. In addition, the turbocharger may operate in a high temperature exhaust gas environment.

SUMMARY OF ILLUSTRATIVE VARIATIONS

A number of variations may involve a bearing system that may include a first bearing assembly that may have an inner race. An outer race may be disposed around the inner race and may be rotatable relative to the inner race. A second bearing assembly may be disposed around the first bearing assembly. The second bearing assembly may be an air bearing. The outer race may be engageable with the inner race through an engagement mechanism that may act on the outer race so that the inner and outer races rotate together.

A number of other variations may involve a bearing system that may support a shaft for rotation at a variable rotational speed. The bearing system may include an inner race through which the shaft may extend. The inner race may rotate with the shaft. The bearing system may include an outer race through which the shaft may extend. The outer race may be disposed around the inner race and may be rotatable relative to the inner race. An air bearing assembly with a foil system may be disposed around the outer race. The foil system may alternatively contact the outer race or separate from the outer race. An engagement mechanism may selectively contact the outer race and may act thereon so that the outer race rotates with the shaft.

A number of additional variations may involve a method and may include providing a shaft operating at a variable rotational speed with a mechanical bearing assembly that may selectively support the shaft for rotation. An air bearing assembly may selectively support the shaft for rotation. The shaft may be supported for rotation with the mechanical bearing assembly during start-up. Whether the variable rotational speed of the shaft is above a first threshold may be determined. When the variable rotational speed is above the first threshold, the air bearing assembly may be activated. A determination may be made for one of: a) whether use of the air bearing assembly has an operational efficiency greater than use of the mechanical bearing assembly, or b) whether the variable rotational speed is greater than a bearing loss speed. The bearing loss speed may be where a bearing loss is less than a second threshold. The mechanical bearing system may be activated either when use of the air bearing assembly does not have an operational efficiency greater than use of the mechanical bearing assembly, or when the variable rotational speed is greater than a bearing loss speed.

Other illustrative variations within the scope of the invention will be apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
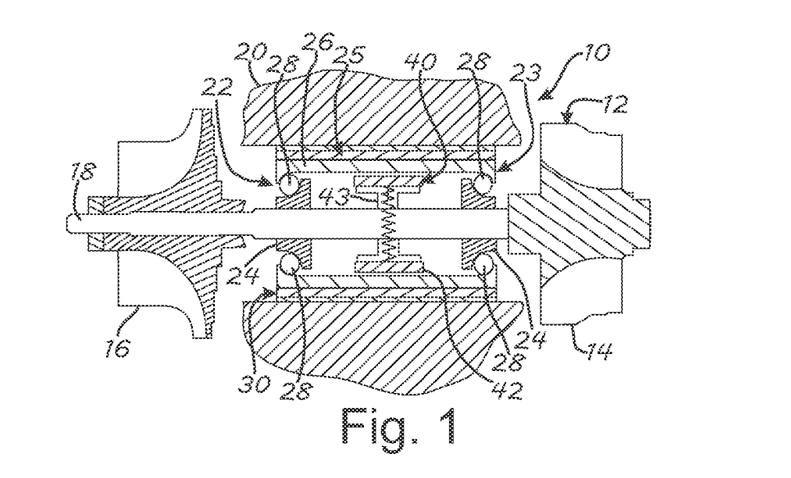
FIG. 1 is a schematic illustration of a product for use with a rotating system according to a number of variations.

In a number of variations as illustrated in FIG. 1, a product 10 may be used with a rotating system, which for purposes of illustration may be a turbocharger system 12 for use with an engine. The turbocharger system 12 may include a turbine wheel 14 that may exist in a continuous high velocity jet of exhaust gases when the engine is running. The turbocharger system 10 may include a compressor wheel 16 that may be connected to the turbine wheel 14 by a shaft 18 so that the turbine wheel 14 and the compressor wheel 16 rotate together at a variable rotational speed. The shaft 18 may extend through a housing 20. A bearing system 22 may be contained in the housing 20, and the shaft 18 may extend through the bearing system 22. The shaft 18 may be supported by the bearing system 22 to rotate with low friction resistance.

The bearing system 22 may include a mechanical bearing assembly 23 that may be a rolling element bearing assembly. The mechanical bearing assembly 23 may be lubricated such as through a supply of oil. The mechanical bearing assembly 23 may include an inner race or races 24 that may be fixed to rotate with the shaft 18. An outer race 26 may be provided in the shape of a hollow cylinder or tube and may extend over the inner races 24. In other variations a plural number of outer races may be provided and/or a singular inner race may be provided. A number of rolling elements 28 may be disposed between the inner race 24 and the outer race 26. The rolling elements 28 may provide for low friction rotation of the inner race 24 within the outer race 26. In a number of variations the rolling elements 28 may be omitted and the outer race 26 may be journaled on the inner race 24 as a plain bearing for the mechanical bearing assembly 23. In a number of variations the bearing assembly 22 may include an air bearing assembly 25, wherein the outer race 26 may be supported on the housing 20 through a foil system 30. The foil system 30 may be configured to separate from the outer race 26 when the shaft 22 rotates at a rotational speed above a "lift-off" speed, which may be defined as the minimum speed at which the rotating elements no longer contact the foil system 30. The rotating elements may include the wheels 14, 16, the shaft 18, and the inner race 24 when operating using the mechanical bearing assembly 23 in activated mode. The rotating elements may also include the outer race 26 when operating using the air bearing assembly 25 in activated mode.

Figure 2:
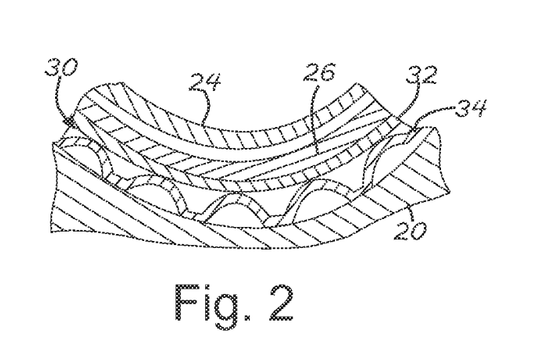
FIG. 2 is a schematic illustration of parts of a bearing system for use with a product according to a number of variations.
Figures 3, 5:
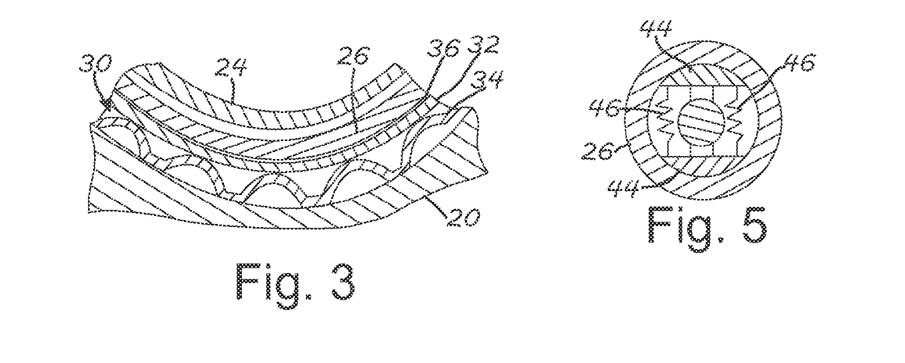
FIG. 3 is a schematic illustration of parts of a bearing system for use with a product according to a number of variations.
FIG. 5 is a schematic illustration of an inertial clutch in an engaged state for use with the product of FIG. 1 according to a number of variations.

With reference to FIG. 2, when the rotating elements rotate at a speed below the lift-off speed, the outer race 26 may be engaged with the housing 20 through the foil system 30, which may include a top foil 32 and a bump foil 34. As a result, when operating through the mechanical bearing assembly 23, the outer race 26 may not rotate relative to the housing 20. The top foil 32 may be disposed between the outer race 26 and the bump foil 34. The bump foil 34 may be disposed between the top foil 32 and the housing 20. The bump foil 34 may include a number of bumps or corrugations that may be compressible to allow the top foil 32 to move toward the housing 20 under pressure. The bump foil 34 and the top foil 32 may generally be stationary relative to the housing 20. As a result, contact with a rotating outer race 26 may effect wear and drag. To avoid wear, when the rotating elements rotate at or above the lift-off speed, air pushes the top foil 32 away from the outer race 26, compressing the bump foil 34 so that there is no contact as shown in FIG. 3. The outer race 26 and the top foil 32 are separated by air pressure which is generated by the rotation. After separation an air space 36 may exist between the outer race 26 and the top foil 32 so that no wear or drag occurs. In a number of variations the rolling elements 28 may allow the inner race 24 to rotate relative to the outer race 26. As a result the outer race 26 may be held from rotation by contact with the top foil 32 at speeds below the lift-off speed. Relative rotation between the inner race 24 and the outer race 26 may reduce wear and drag at speeds below the lift-off speed since the outer race 26 and the top foil 32 do not slide against one another.

In a number of variations the bearing system 22 may include an engagement mechanism 40 that may alternatively engage the outer race 26 with the rotating elements and may disengage the outer race 26 from the rotating elements. When the outer race 26 is engaged with the rotating elements it may become a rotating element. For example, at speeds below the lift-off speed the outer race 26 may be disengaged from the rotating elements through disengagement of the engagement mechanism 40. At low speeds the rolling elements 28 may support the shaft 18 for low friction rotation and the outer race 26 may be non-rotating so as to not create wear and drag with the top foil 32. At higher speeds at or above the lift-off speed, the outer race 26 may be engaged with the rotating elements through the engagement mechanism 40. As a result of engagement, the outer race 26 may rotate with the rotating elements at or above the lift-off speed, which forces air between the outer race 26 and the top foil 32 to effect separation and creation of the air space 36. The outer race 26 may be engaged with the inner race 24 indirectly through the shaft 18 and the engagement mechanism 40.

Figure 4:
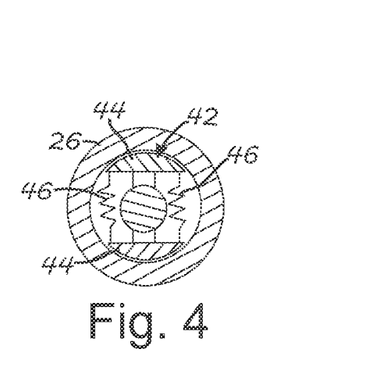
FIG. 4 is a schematic illustration of an inertial clutch in a disengaged state for use with the product of FIG. 1 according to a number of variations.

In a number of variations the engagement mechanism 40 may comprise an inertial clutch 42. With additional reference to FIGS. 4 and 5, the inertial clutch 42 may include one or more inertial elements 44. The inertial elements 44 may be biased radially inward toward the shaft 18 to which the inertial clutch 42 may be directly connected as shown in FIG. 1. The inertial clutch 42 may include a base 43 that may be fixed to the shaft 18. A number of springs or other resilient elements 46 may apply a force to the inertial elements 44 to hold them away from the outer race 26 during low speed rotation. As speed increases, centrifugal force on the inertial elements 44 may cause them to overcome the force of the resilient elements 46 and to move toward and contact the outer race 26 as shown in FIG. 5. The mass of the inertial elements 44 and the spring constant of the resilient elements 46 may be selected so that the inertial elements 44 engage with the outer race 26 at the lift-off speed. As a result, when the shaft 18 rotates at or above the lift-off speed, the inertial elements 44 may engage the shaft 18 with the outer race 26. Rotation of the outer race 26 will cause formation of the air space 36 (shown in FIG. 3), so that the top foil 32 lifts off from the outer race 26. Through these variations, the rolling elements 28 may support the shaft 18 for rotation at low speed and other select speeds with minimal or no wear and drag between the rotating elements and the foil system 30. At or above the lift-off speed, the outer race 26 may rotate, and may separate from the foil system 30 providing minimal or no wear and drag between the rotating elements and the foil system 30.

Figure 6:
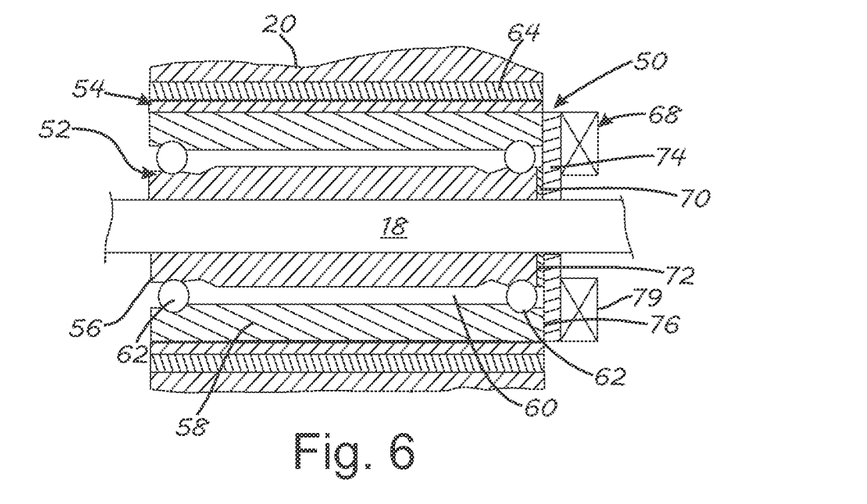
FIG. 6 is a schematic illustration of a product for use with a rotating system according to a number of variations.

With reference to FIG. 6, in a number of variations a bearing system 50 may include a rolling element bearing assembly 52 as the mechanical bearing assembly and an air bearing assembly 54. The bearing system 50 may be used with the product 10 in place of the bearing system 22. The rolling element bearing assembly 52 may include an inner race 56 through which the shaft 18 may extend so that the two rotate together. An outer race 58 may be disposed around the inner race 56 to define a gap 60 in between. A number of rolling elements 62 may be engaged between the inner and outer races 56, 58 to provide low friction relative rotation. The air bearing assembly 54 may include the outer race 58 and a foil system 64 that may be disposed between the outer race 58 and the housing 20. The foil system 64 may be of the type described in relation to FIGS. 2 and 3 or may be another type. The rolling element bearing assembly 52 may support rotation between the shaft 18 and the housing 20 at select speeds that may include speeds below the lift-off speed of the air bearing assembly 54. Above the lift-off speed, the air bearing assembly 54 may support rotation between the shaft 18 and the housing 20. Above the lift-off speed the air bearing assembly 54 may be deactivated for select operation using the rolling element bearing assembly 52. When rotational speed of the shaft 18 reaches the lift-off speed, an engagement mechanism 68 that may be a clutch system, may connect the inner race 56 with the outer race 58 so that there is no relative rotation between the two. With the engagement mechanism 68 engaged, the outer race 58 may rotate at or above the lift-off speed with the shaft 18 and the inner race 56. The generated air wedge may cause the foil system 64 to lift off the outer race 58 for non-contact rotation.

In a number of variations the engagement mechanism 68 may include a washer 70 that may be positioned at the end 72 of the inner race 56. The washer 70 may have an outermost diameter that may be approximately the same as that of the inner race 56. A clutch friction disc 74 may be positioned adjacent the washer 72 and adjacent an end 76 of the outer race 58. A magnetic ring 79, which may be an electro-magnetic ring, may be positioned adjacent the friction disc 74 and may operate as an electromagnetic actuator. The magnetic ring 79 may be selectively energized to activate the air bearing assembly 54 by applying pressure to the friction disc 74 and forcing it against the washer 72 and the end 76 of the outer race 58. Through friction, the friction disc 74 may connect the inner and outer races 56, 58 so that they rotate together. The inner and outer races 56, 58 may be engaged directly or indirectly through the shaft 18, or the washer 70, or the friction disc 74, or through a combination thereof.

Figure 7:
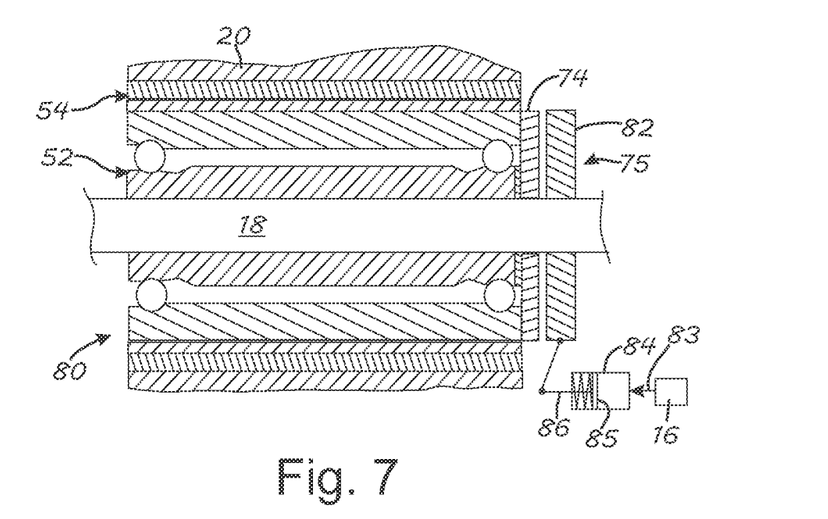
FIG. 7 is a schematic illustration of a product for use with a rotating system according to a number of variations.

With reference to FIG. 7, in a number of variations a bearing system 80 may include the rolling element bearing assembly 52 and the air bearing assembly 54. The bearing system 80 may be used in the product 10 in place of the bearing system 22. As part of the engagement mechanism of the bearing system 80, the magnetic ring 79 of the bearing system 50, may be replaced by a pressure plate 82 that may be positioned adjacent the friction disc 74 to provide an engagement mechanism 75. An actuator 84 may be connected to the pressure plate 82 through a linkage 86. The actuator 84 may be of a known type such as operates on fluid pressure, electricity, or other principles. In a number of variations the actuator may be a pneumatic actuator with a diaphragm or piston 85 connected to the linkage 86. In a number of variations the actuator 84 may operate on gas pressure that may be supplied from the boost pressure at the outlet from the compressor wheel 16 through a connecting conduit 83. The actuator 84 may be calibrated to use the boost pressure to engage the engagement mechanism 75 when the variable rotational speed reaches the lift-off speed. At the lift-off speed the pressure supplied to the actuator 84 may be sufficient to move the pressure plate 82 to apply pressure to the friction disc 74 and force it against the washer 72 and the end 76 of the outer race 58. Through friction, the friction disc 74 may connect the inner and outer races 56, 58 so that they rotate together.

Figure 8:
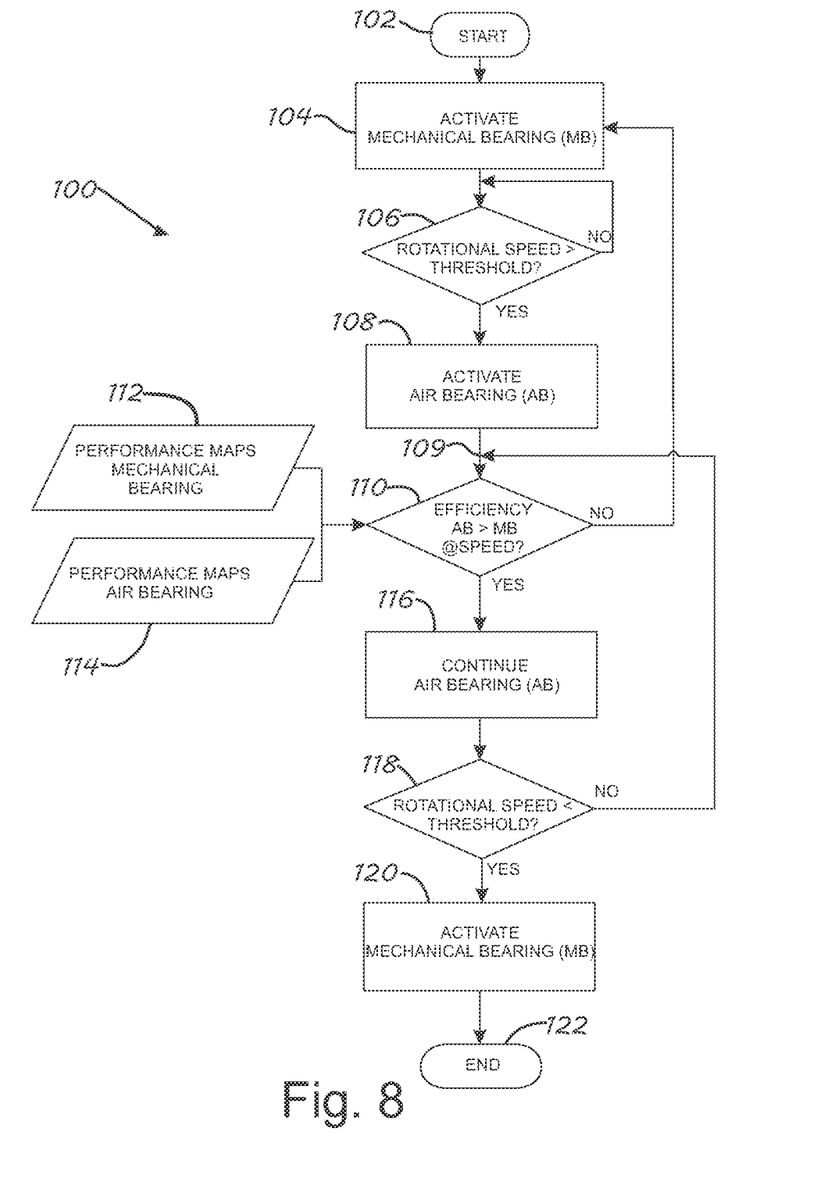
FIG. 8 is a diagram of a method for active control of a product according to a number of variations.

In a number of variations as depicted in FIG. 8, a method 100 may provide for the active control of a product such as the product 10, which may use the bearing system 22, 50 or 80, or another bearing system with mechanical bearing capability such as a rolling element or plain bearing, and which may use a bearing with hydrodynamic capability such as an air bearing assembly. In operation of the method 100, multiple methods, algorithms, or parts thereof may be implemented in a computer program product of an electronic controller including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of variations, the program(s) may be embodied on computer readable media, which can include one or more storage devices, articles of manufacture, or the like. Illustrative computer readable media may include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data may be transferred or provided over a network or another communications connection (either wired, wireless, or a combination thereof). Any combination(s) of the above examples is also included within the scope of the computer-readable media. It is therefore to be understood that methods may be at least partially performed by any electronic articles and/or devices capable of executing instructions corresponding to one or more steps of the disclosed methods.

The method 100 may be initiated at start step 102 such as at start-up of the product 10 when ignition in an associated internal combustion engine begins, and may proceed to step 104. At step 104 operation of the mechanical bearing assembly, such as the bearing assembly 22, 50 or 80, may be activated. For example, the engagement mechanism 40, 68 or 75 may be disengaged so that the product operates with the mechanical bearing assembly. The method 100 may proceed to step 106 where rotational speed of the product 10 may be measured such as through a speed sensor. When the rotational speed exceeds a threshold, such as the lift-off speed of the product 10, the method 100 may proceed to step 108 where the air bearing, such as air bearing assembly 25 or 54 may be activated. For example, the engagement mechanism 40, 68 or 75 may be engaged to provide activation. In a number of variations, in addition to requiring a speed above the lift-off speed, step 106 may be set to proceed only where the threshold speed is based on other factors and is exceed. For example, the threshold may require a speed at or exceeding ten percent of the peak (maximum), operating speed of the product. This may correspond to a threshold minimum speed where operating efficiency using the air bearing assembly first exceeds operating efficiency using the mechanical bearing assembly.

The method 100 may proceed to step 110 where the rotational speed of the product 10 is again measured and for the current operating speed, the operating efficiency of the product 10 using the mechanical bearing is compared to the operating efficiency of the product 10 using the air bearing. It is known to describe the efficiency of a turbocharger with compressor and turbine maps. The compressor map may plot air flow versus pressure ratio for a given compressor speed. Air flow rate through the compressor is defined on the horizontal axis and pressure ratio (air pressure after the compressor compared to the air pressure before the compressor), is defined on the vertical axis. The contours in the compressor map describe the compressor efficiency at various speeds. The turbine map may plot corrected flow on the vertical axis and pressure ratio on the horizontal axis. Turbine efficiency is described by the plotted lines, each corresponding to a given turbine speed. Accordingly, for various operating speeds, the efficiency of a turbine and a compressor is known. The compressor and turbine maps may be generated in a known fashion when operating using the mechanical bearing assembly and separately when using the air bearing assembly. The maps may be entered into controller memory, such as in the form of look up tables that list combined turbine and compressor efficiency of the product 10 for various operating speeds. In step 100 the efficiency value of the product 10 using the air bearing assembly may be compared to the efficiency of the product 10 using the mechanical bearing assembly. It has been found that the efficiency of the product 10 may be greater operating with the mechanical bearing assembly rather than the air bearing assembly at speeds above the threshold speed of step 106. In other words, above the lift-off speed, it may be desirable to operate a product, such as the product 10 using the mechanical bearing assembly with the air bearing assembly deactivated.

The performance maps for the product 10 using the mechanical bearing assembly may be stored at step 112 such as in look-up tables or other data forms. The performance maps for the product 10 using the air bearing assembly may be stored at step 114 such as in look-up tables or other data forms. The data of steps 112 and 114 may be provided to step 110. At step 110, using the stored data if it is determined that the operating efficiency using the air bearing is not greater than the operating efficiency using the mechanical bearing at the current operational speed, the method 100 may return to step 104 where the mechanical bearing assembly is reactivated (deactivating the air bearing assembly), and the method 100 may proceed. To reactive the mechanical bearing assembly, the engagement mechanism, such as the engagement mechanism 40, 68 or 75 may be disengaged.

Using the data, if it is determined at step 110 that the operating efficiency using the air bearing is greater than the operating efficiency using the mechanical bearing at the current operational speed, the method 100 may proceed to step 116 where operation using the air bearing may continue. The method 100 may proceed to step 118 where a determination may be made as to whether the current operating speed is reduced to less than the threshold speed. Again, the threshold speed may be the lift-off speed or may be a speed above the lift-off speed below which operating efficiency using the mechanical bearing assembly exceeds operating efficiency using the air bearing assembly. If at step 118 it is determined that the current operating speed is not less than the threshold, the method 100 may return to point 109 and may continue therefrom to step 110. If at step 118 it is determined that the current operating speed is less than the threshold, the method 100 may continue to step 120 where the mechanical bearing may be reactivated through the engagement mechanism, such as by disengagement of the engagement mechanism 40, 68 or 75. From step 120 the method 100 may proceed to step 122 where it may end if the product 10 is shut down or if operation of the product 10 continues, may reset to step 102. If it is determined at step 118 that the current operating speed is not less than the threshold, the method 100 may return to point 109 and may proceed therefrom to step 110, and may continue.

Figure 9:
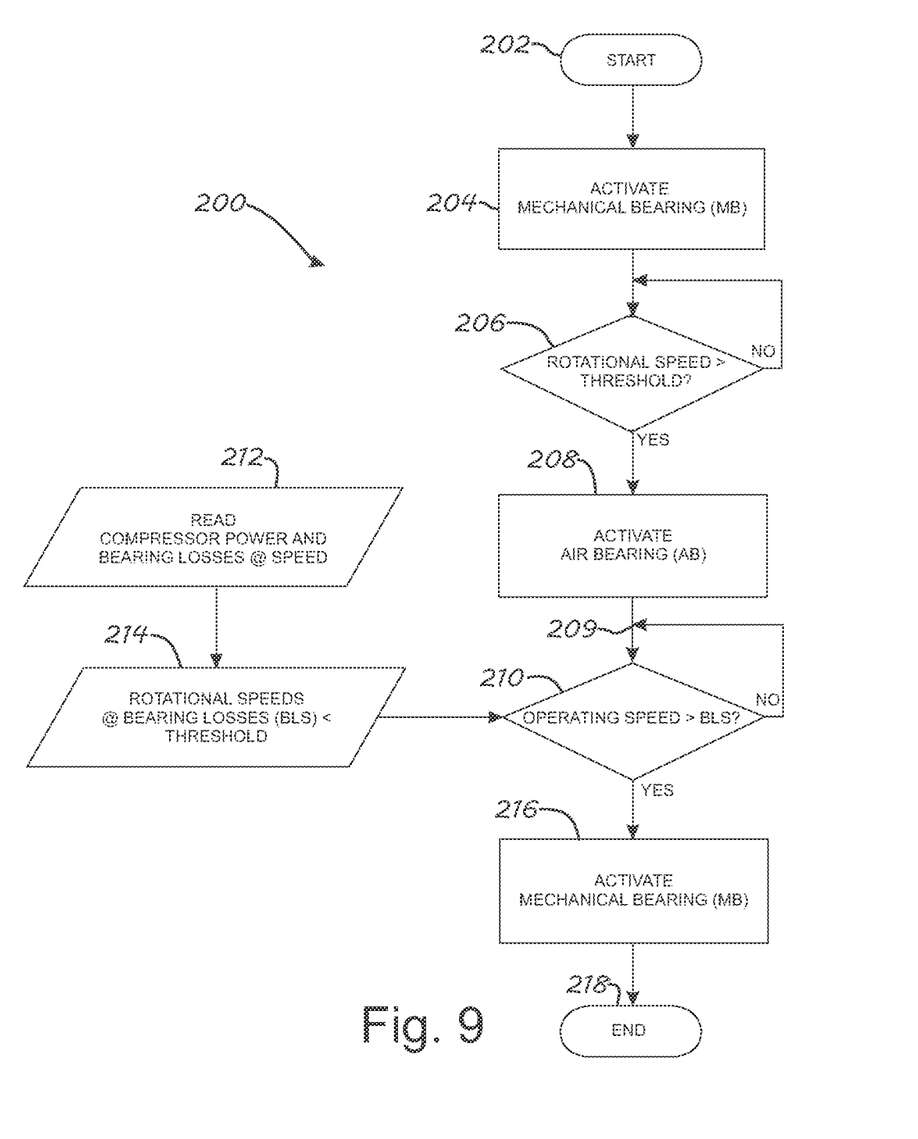
FIG. 9 is a diagram of a method for active control of a product according to a number of variations.

In a number of variations as depicted in FIG. 9, a method 200 may provide for the active control of a product such as the product 10, which may use the bearing system 22, 50 or 80, or another bearing system with mechanical bearing capability such as a rolling element or plain bearing, and which may use a bearing with hydrodynamic capability such as an air bearing assembly. The method 200 may be initiated at start step 202 such as at start-up of the product 10 when ignition in an associated internal combustion engine begins, and may proceed to step 204. At step 204 operation of the mechanical bearing assembly, such as the bearing assembly 22, 50 or 80, may be activated. For example, the engagement mechanism 40, 68 or 75 may be disengaged so that the product operates with the mechanical bearing assembly. The method 200 may proceed to step 206 where rotational speed of the product 10 may be measured such as through a speed sensor. When the rotational speed exceeds the lift-off speed of the product 10, or a higher speed that considers other factors such as efficiency, the method 200 may proceed to step 208 where the air bearing, such as air bearing assembly 25 or 54 may be activated. For example, the engagement mechanism 40, 68 or 75 may be engaged to provide activation. In a number of variations, in addition to being above the lift-off speed, the step 206 may be set to proceed only where a threshold speed is exceed, for example such as ten percent of the peak (maximum), operating speed. This may correspond to a threshold minimum speed where operating efficiency using the air bearing assembly first exceeds operating efficiency using the mechanical bearing assembly.

The method 200 may proceed to step 210 where the rotational speed of the product 10 is again measured and the current operating speed may be compared to a bearing loss speed (BLS). The BLS may comprise an operating speed of the product 10 where the percent bearing loss is less than a threshold. The percent bearing loss may be determined as the proportion of bearing loss over compressor power of the product 10 and may be defined according to known methods. Bearing loss may be determined or estimated according to known methods as a function of rotational speed and thrust loading and may be charted in a bearing performance map for various speeds. Compressor power may be determined according to known methods as a function of mass flow, temperature and boost and may be charted in a performance map for various speeds. At step 212, the method 200 may use the operating speed of step 210 and may obtain compressor power and bearing loss, such as from look-up tables or other stored compressor and bearing data. From step 212, the method 200 may proceed to step 214 where for the rotational speeds of the product where the percent bearing loss is less than a threshold (BLS), are recorded. Alternatively, the BLS are predetermined and stored at step 214 for reference by the method 200. It has been determined that as the operating speed of the product 10 increases, absolute bearing loss in watts increases but the percent bearing loss decreases because the compressor power increases a greater proportion. This means that operating using the mechanical bearing assembly may become more efficient than operating using the air bearing assembly. In a number of variations efficiency/durability may be optimized with the threshold of step 214 set at operational speeds where the percent bearing loss is less than 5%. In a number of other variations efficiency/durability may be optimized with the threshold of step 214 at operational speeds where the percent bearing loss is set at less than 2-3%. In a number of variations the threshold for step 214 may alternatively be preset at a percentage of peak operational speed, such as sixty percent. This may be an operational speed above which the percent bearing loss is less than the threshold.

The BLS determined at step 214 may be provided to step 210 and if the current operating speed is greater than the BLS, the method 200 may proceed to step 216. At step 216 operation of the mechanical bearing assembly, such as the bearing assembly 22, 50 or 80, may be activated. For example, the engagement mechanism 40, 68 or 75 may be disengaged so that the product operates with the mechanical bearing assembly. This may mean that operation of the product 10 at elevated speeds, such as above 60 percent of maximum operating speed may involve use of the mechanical bearing assembly rather than the air bearing assembly. From step 216, the method 200 may proceed to step 218 where the routine may end and may reset to step 202. If it is determined at step 210 that the current operating speed is not greater than the BLS, the method 200 may return to point 209 and may proceed therefrom.

Through the foregoing variations a bearing system may avoid undesirable rotational contact and wear at the air bearing assembly at speeds under the lift-off speed with the mechanical bearing assembly supporting the rotation. Above the lift-off speed, there may be no relative rotation in the mechanical bearing assembly, and the air bearing assembly may support the rotation. This may limit the amount of time the air bearing assembly is under rotation at low speed and that the mechanical bearing assembly is under rotation at high speeds. This may provide extended life of both the air bearing assembly and of the mechanical bearing assembly. In addition, by reducing high speed operation of the mechanical bearing assembly, an active oil supply may be avoided. In addition, efficiency may be improved by reactivating the mechanical bearing assembly above a threshold operating speed.

The description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a bearing system that may include a first bearing assembly that may have an inner race. An outer race may be disposed around the inner race and may be rotatable relative to the inner race. A second bearing assembly may be disposed around the first bearing assembly. The second bearing assembly may be an air bearing. An engagement mechanism may operate so that the outer race is engageable with the inner race through the engagement mechanism that acts on the outer race so that the inner and outer races rotate together.

Variation 2 may include the bearing system of variation 1 wherein the first bearing assembly may include a number of rolling elements that may be disposed between the inner race and the outer race.

Variation 3 may include the bearing system of variation 1 wherein the second bearing assembly may include a foil system. The outer race may contact the foil system at some rotational speeds.

Variation 4 may include the bearing system of variation 3 wherein the foil system may include a top foil that may contact the outer race and a bump foil that may support the top foil.

Variation 5 may include the bearing system of variation 1 wherein the engagement mechanism may be actively controlled and may selectively contact the outer race and may be selectively spaced apart from the outer race.

Variation 6 may include the bearing system of variation 5 wherein the engagement mechanism may be an inertial clutch and may include at least one inertial element that may be engageable with the outer race.

Variation 7 may include the bearing system of variation 5 wherein the engagement mechanism may be an electromagnetic clutch and may include an electromagnetic ring.

Variation 8 may include the bearing system of variation 5 wherein the engagement mechanism may be a clutch and may include a pneumatic actuator.

Variation 9 may include the bearing system of variation 8 and may include a compressor wheel that may rotate with the inner race. The pneumatic actuator may be supplied with a pressure from the compressor wheel.

Variation 10 may include the bearing system of variation 5 wherein the engagement mechanism may be disposed inside the outer race.

Variation 11 may involve a bearing system that may support a shaft for rotation. The bearing system may include an inner race through which the shaft may extend. The inner race may rotate with the shaft. The nearing system may include an outer race through which the shaft may extend. The outer race may be disposed around the inner race and may be rotatable relative to the inner race. An air bearing assembly with a foil system may be disposed around the outer race. The foil system may alternatively contact the outer race or separate from the outer race. An engagement mechanism may selectively contact the outer race and may act thereon so that the outer race rotates with the shaft.

Variation 12 may include the bearing system of variation 11 and may include an engagement mechanism that may comprise a magnetic ring and a friction disc. The friction disc may be positioned between the magnetic ring and the friction disc so that under select operation of the magnetic ring the friction disc may be forced against the outer race.

Variation 13 may include the bearing system of variation 11 wherein the foil system may separate from the outer race at a lift-off speed of rotation of the shaft. The engagement mechanism may engage the outer race at approximately the lift-off speed to rotate the outer race with the shaft.

Variation 14 may include the bearing system of variation 13 wherein the engagement mechanism may comprise a pneumatic actuator linked to a pressure plate, with a friction disc positioned between the pressure plate and the outer race.

Variation 15 may involve a method and may include providing a shaft. A mechanical bearing assembly may selectively support the shaft for rotation. An air bearing assembly may selectively support the shaft for rotation. The shaft may be supported for rotation with the mechanical bearing assembly during start-up. Whether the rotational speed of the shaft is above a first threshold may be determined. When the rotational speed is above the first threshold, the air bearing assembly may be activated. A determination may be made for one of: a) whether use of the air bearing assembly has an operational efficiency greater than use of the mechanical bearing assembly, or b) whether the rotational speed is greater than a bearing loss speed. The bearing loss speed may be where a bearing loss is less than a second threshold. The mechanical bearing system may be activated either when using the air bearing assembly does not have an operational efficiency greater than using the mechanical bearing assembly, or when the rotational speed is greater than a bearing loss speed.

Variation 16 may include the method according to variation 15 and may include the step of determining whether the rotational speed is less than the first threshold. The mechanical bearing assembly may be activated when the rotational speed is less than the first threshold.

Variation 17 may include the method according to variation 15 and may include providing a compressor on the shaft that may generate a compressor power. The bearing loss speed may be determined by determining the rotational speeds at which bearing losses are less than five percent of the compressor power.

Variation 18 may include the method according to variation 15 and may include activating the mechanical bearing assembly when using the air bearing assembly does not have an operational efficiency greater than using the mechanical bearing assembly.

Variation 19 may include the method according to variation 15 and may include providing a pneumatic actuator to activate the air bearing assembly.

Variation 20 may include the method according to variation 15 and may include providing an electromagnetic actuator to activate the air bearing system.

The above description of select variations within the scope of the invention is merely illustrative in nature and, thus, variations or variants thereof are not to be regarded as a departure from the spirit and scope of the invention.

What is claimed is:

1. A bearing system comprising a first bearing assembly that has an inner race and an outer race disposed around the inner race and rotatable relative to the inner race, and a second bearing assembly disposed around the first bearing assembly, the second bearing assembly being an air bearing, and an engagement mechanism wherein the outer race is engageable with the inner race through the engagement mechanism that acts on the outer race by selectively and directly contacting the outer race so that the inner and outer races rotate together, and the engagement mechanism is selectively separable from the outer race releasing the outer race so that the inner and outer races rotate relative to each other.

2. The bearing system according to claim 1 wherein the first bearing assembly further comprises a number of rolling elements disposed between the inner race and the outer race.

3. The bearing system according to claim 1 wherein the second bearing assembly includes a foil system and wherein the outer race contacts the foil system at some rotational speeds.

4. The bearing system according to claim 3 wherein the foil system includes a top foil that contacts the outer race and a bump foil that supports the top foil.

5. The bearing system according to claim 1 wherein the outer race rotates about a shaft that extends in an axial direction, wherein the engagement mechanism is contained completely within the outer race including in the axial direction.

6. The bearing system according to claim 5 further comprising a shaft extending through the inner race and wherein the engagement mechanism is an inertial clutch connected to the shaft and includes at least one inertial element that is engageable to contact the outer race.

7. The bearing system according to claim 1 wherein the engagement mechanism is an electromagnetic clutch and includes an electromagnetic ring.

8. The bearing system according to claim 1 wherein the engagement mechanism is a clutch and includes a pneumatic actuator.

9. The bearing system according to claim 1 wherein the outer race rotates about an axis and comprising two sets of rolling elements that are spaced apart along the axis wherein the engagement mechanism is disposed along the axis between the two sets of rolling elements.

10. A bearing system comprising a first bearing assembly that has an inner race and an outer race disposed around the inner race and rotatable relative to the inner race, and a second bearing assembly disposed around the first bearing assembly, the second bearing assembly being an air bearing, and an engagement mechanism wherein the outer race is engageable with the inner race through the engagement mechanism that acts on the outer race so that the inner and outer races rotate together wherein the engagement mechanism is a clutch and includes a pneumatic actuator, and further comprising a compressor wheel rotating with the inner race, wherein the pneumatic actuator is supplied with a pressure from the compressor wheel.

11. A bearing system supporting a shaft for rotation comprising an inner race through which the shaft extends, the inner race rotating with the shaft, an outer race through which the shaft extends and disposed around the inner race and rotatable relative to the inner race, an air bearing assembly that has a foil system disposed around the outer race, the foil system alternatively contacting the outer race or separating from the outer race, and an engagement mechanism that directly contacts the shaft and that selectively contacts the outer race acting thereon so that the outer race rotates with the shaft.

12. The bearing system according to claim 11 wherein the engagement mechanism comprises a magnetic ring and a friction disc wherein the friction disc is positioned between the magnetic ring and the friction disc so that under select operation of the magnetic ring the friction disc is forced against the outer race.

13. The bearing system according to claim 11 wherein the engagement mechanism comprises a base fixed directly to the shaft.

14. The bearing system according to claim 11 wherein the engagement mechanism comprises a pneumatic actuator linked to a pressure plate, with a friction disc positioned between the pressure plate and the outer race.

15. A method comprising providing a shaft operating at variable rotational speed, providing a mechanical bearing assembly selectively supporting the shaft for rotation, providing an air bearing assembly selectively supporting the shaft for rotation, supporting the shaft for rotation with the mechanical bearing assembly during a start-up of the shaft, determining whether the variable rotational speed of the shaft is above a first threshold, when the variable rotational speed is above the first threshold, activating the air bearing assembly, determining one of: a) whether use of the air bearing assembly has an operational efficiency greater than use of the mechanical bearing assembly, or b) whether the variable rotational speed is greater than a bearing loss speed where the bearing loss speed is where a bearing loss is less than a second threshold, and activating the mechanical bearing system if it is determined that either use of the air bearing assembly does not have an operational efficiency greater than use of the mechanical bearing assembly, or the variable rotational speed is greater than a bearing loss speed.

16. The method according to claim 15 further comprising the step of determining whether the rotational speed is less than the first threshold and activating the mechanical bearing assembly when the rotational speed is less than the first threshold.

17. The method according to claim 15 further comprising providing a compressor on the shaft that generates a compressor power and determining the bearing loss speed by determining the rotational speeds at which bearing losses are less than five percent of the compressor power.

18. The method according to claim 15 further comprising activating the mechanical bearing assembly when using the air bearing assembly does not have an operational efficiency greater than using the mechanical bearing assembly.

19. The method according to claim 15 further comprising providing a pneumatic actuator to activate the air bearing assembly.

20. The method according to claim 15 further comprising providing an electromagnetic actuator to activate the air bearing system.

* * * * *